(12) United States Patent
Yan et al.

(10) Patent No.: US 7,436,955 B2
(45) Date of Patent: Oct. 14, 2008

(54) ENCRYPTING AND DECRYPTING A DATA STREAM

(75) Inventors: Rong Yan, Beijing (CN); Jian Zhang, Shanghai (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/839,915

(22) Filed: May 6, 2004

(65) Prior Publication Data

US 2004/0223611 A1 Nov. 11, 2004

(30) Foreign Application Priority Data

May 6, 2003 (CN) .............................. 03 1 23416

(51) Int. Cl.
*H04K 1/04* (2006.01)
*H04L 9/00* (2006.01)
*H04L 9/32* (2006.01)
*G06F 11/30* (2006.01)

(52) U.S. Cl. .................. 380/37; 713/151; 713/152; 713/153; 713/154; 713/182; 713/188; 726/23; 726/24; 726/25; 726/26; 726/27; 709/223; 709/224; 709/225; 709/226

(58) Field of Classification Search .................. 380/37
See application file for complete search history.

(56) References Cited

U.S. PATENT DOCUMENTS

| 6,026,164 | A | 2/2000 | Sakamoto et al. |
| 6,879,689 | B2 * | 4/2005 | Carroll et al. ............... 380/44 |
| 6,957,350 | B1 * | 10/2005 | Demos ....................... 380/203 |
| 2002/0018565 | A1 * | 2/2002 | Luttrell et al. ............ 380/217 |
| 2003/0012372 | A1 * | 1/2003 | Cheng ........................ 380/28 |
| 2004/0081333 | A1 * | 4/2004 | Grab et al. ................ 382/100 |
| 2004/0158703 | A1 * | 8/2004 | Lund ......................... 713/150 |

* cited by examiner

*Primary Examiner*—Longbit Chai
(74) *Attorney, Agent, or Firm*—Louis P. Herzberg

(57) ABSTRACT

The present invention provides methods, systems and apparatus for encrypting and for decrypting a data stream, for securely sending a data stream and for securely receiving a data stream, and for secure transmission of a data stream. The data stream, after at least a part of it being encrypted, is transmitted from a sender to a receiver via a channel. An exemplary method for encrypting comprises: adjusting encryption attributes during transmission; encrypting the data stream according to the adjusted encryption attributes; and transmitting the encrypted data stream and information of the encryption attributes to the receiver.

29 Claims, 7 Drawing Sheets

ENCRYPTING AND DECRYPTING A DATA STREAM

TECHNICAL FIELD

The present invention relates to data encryption, and particularly, to a method and apparatus for encrypting and decrypting a data stream and a system for secure transmission of a data stream.

BACKGROUND OF THE INVENTION

With the tendency of digitizing audio and video information and the development of computer and network technology, digitized audio and video works are distributed to users through networks in the form of data streams (such as, MPEG or MP3 format stream), which have been widely employed. A security problem arises with data streams being transmitted in a network environment.

The protection of a data stream in a network is usually realized by means of encryption. At present, many kinds of encryption approaches for MPEG stream have been proposed, for example, Naive Algorithm, Selective Algorithm, ZigZag-Permutation Algorithm, etc. These algorithms provide a series of encryption approaches, from the simple to the complex, for data streams.

However, in these traditional data stream encryption approaches, a data stream is usually encrypted with a single policy without considering the situation of the receiver, the sender and the channel between them. As a result either the resources are wasted or the quality of information reproduction is degraded.

First, encryption and decryption operations heavily consume system resources, including processor computation, storage spaces and bandwidths of the sender and the receiver. Therefore, if the strength of encryption and decryption can not be adjusted at proper time to accommodate to the consumption of the system resources, neither the data stream can get best protection when the resources are not fully utilized, nor the data stream can be encrypted and decrypted in real-time and the reproduction quality is degraded when the resources are over-utilized.

Furthermore, the network environment may vary with time, leading to frequent changes of channel quality. For example, Bit Error Rate (BER), Packet Loss Rate (PLR), time delay, etc. of a channel may vary greatly, especially in the environments of wireless communication or wide area network like the Internet. Thus, if the same encryption policy is adopted for the whole volume of a data stream, the quality of reproduction may be degraded because the receiver cannot receive enough data for decrypting in time.

SUMMARY OF THE INVENTION

In order to solve the problems in the existing techniques mentioned above, according to an aspect of the present invention, there is provided a method for encrypting a data stream that is transmitted from a sender to a receiver via a channel, after at least a part of which is encrypted. A method comprises adjusting encryption attributes during transmission; encrypting the data stream according to the adjusted encryption attributes; and transmitting the encrypted data stream and information of the encryption attributes to the receiver.

According to another aspect of the present invention, there is provided a method for decrypting a data stream that is transmitted from a sender to a receiver via a channel, after at least a part of which is encrypted. A method comprises: receiving adjusted encryption attributes during reception of the encrypted data stream; and decrypting the data stream according to the adjusted encryption attributes.

According to yet another aspect, there is provided an apparatus for encrypting a data stream that is transmitted from a sender to a receiver via a channel, after at least a part of which is encrypted. An apparatus for encrypting comprises: encryption attribute adjusting means for adjusting encryption attributes during transmission of the data stream to generate encryption attribute information; and a scrambler for performing encryption of said at least part of the data stream according to the encryption attributes adjusted by said encryption attribute adjusting means.

According to still another aspect of the present invention, there is provided an apparatus for decrypting a data stream that is transmitted from a sender to a receiver via a channel after at least a part of which is encrypted. An apparatus for decrypting comprises: an encryption adjustment information receiving unit for receiving the encryption attribute information from the sender; and an unscrambler for performing decryption of said data stream according to the encryption attribute information received by said encryption adjustment information unit.

According to still another aspect of the present invention, there is provided an apparatus for sending a data stream in security, comprising the above-mentioned apparatus for encrypting.

According to still another aspect of the present invention, there is provided an apparatus for receiving a data stream in security, comprising the above-mentioned apparatus for decrypting According to still another aspect of the present invention, there is provided a system for secure transmission of a data stream, comprising the above-mentioned apparatus for sending a data stream, the above-mentioned apparatus for receiving a data stream and a channel connecting said apparatus for sending a data stream and said apparatus for receiving a data stream.

BRIEF DESCRIPTION OF THE DRAWINGS

The above features, advantages and objectives of the present invention will become apparent through the description of preferred embodiments of the present invention with reference to the accompanying drawings, in which.

DETAILED DESCRIPTION OF THE INVENTION

The present invention provides methods, apparatus and systems for encrypting a data stream transmitted from a sender to a receiver via a channel, after at least a part of which is encrypted. An example of a method comprises adjusting encryption attributes during transmission; encrypting the data stream according to the adjusted encryption attributes; and transmitting said encrypted data stream and information of said encryption attributes to said receiver.

The present invention also provides a method for decrypting a data stream that is transmitted from a sender to a receiver via a channel, after at least a part of which is encrypted, said method comprising: receiving adjusted encryption attributes during reception of the encrypted data stream; and decrypting the data stream according to said adjusted encryption attributes.

The present invention also provides an apparatus for encrypting a data stream that is transmitted from a sender to a receiver via a channel, after at least a part of which is encrypted. An example of an apparatus for encrypting comprises: encryption attribute adjusting means for adjusting encryption attributes during transmission of the data stream to generate encryption attribute information; and a scrambler for performing encryption of said at least part of the data stream according to the encryption attributes adjusted by said encryption attribute adjusting means.

The present invention also provides an apparatus for decrypting a data stream that is transmitted from a sender to a receiver via a channel after at least a part of which is encrypted. An example of an apparatus for decrypting comprises: an encryption adjustment information receiving unit for receiving the encryption attribute information from the sender; and an unscrambler for performing decryption of said data stream according to the encryption attribute information received by said encryption adjustment information unit.

The present invention also provides an apparatus for sending a data stream in security, comprising the above-mentioned apparatus for encrypting.

The present invention also provides an apparatus for receiving a data stream in security, comprising the above-mentioned apparatus for decrypting The present invention also provides a system for secure transmission of a data stream, comprising the above-mentioned apparatus for sending a data stream, the above-mentioned apparatus for receiving a data stream and a channel connecting said apparatus for sending a data stream and said apparatus for receiving a data stream.

Figure 1:
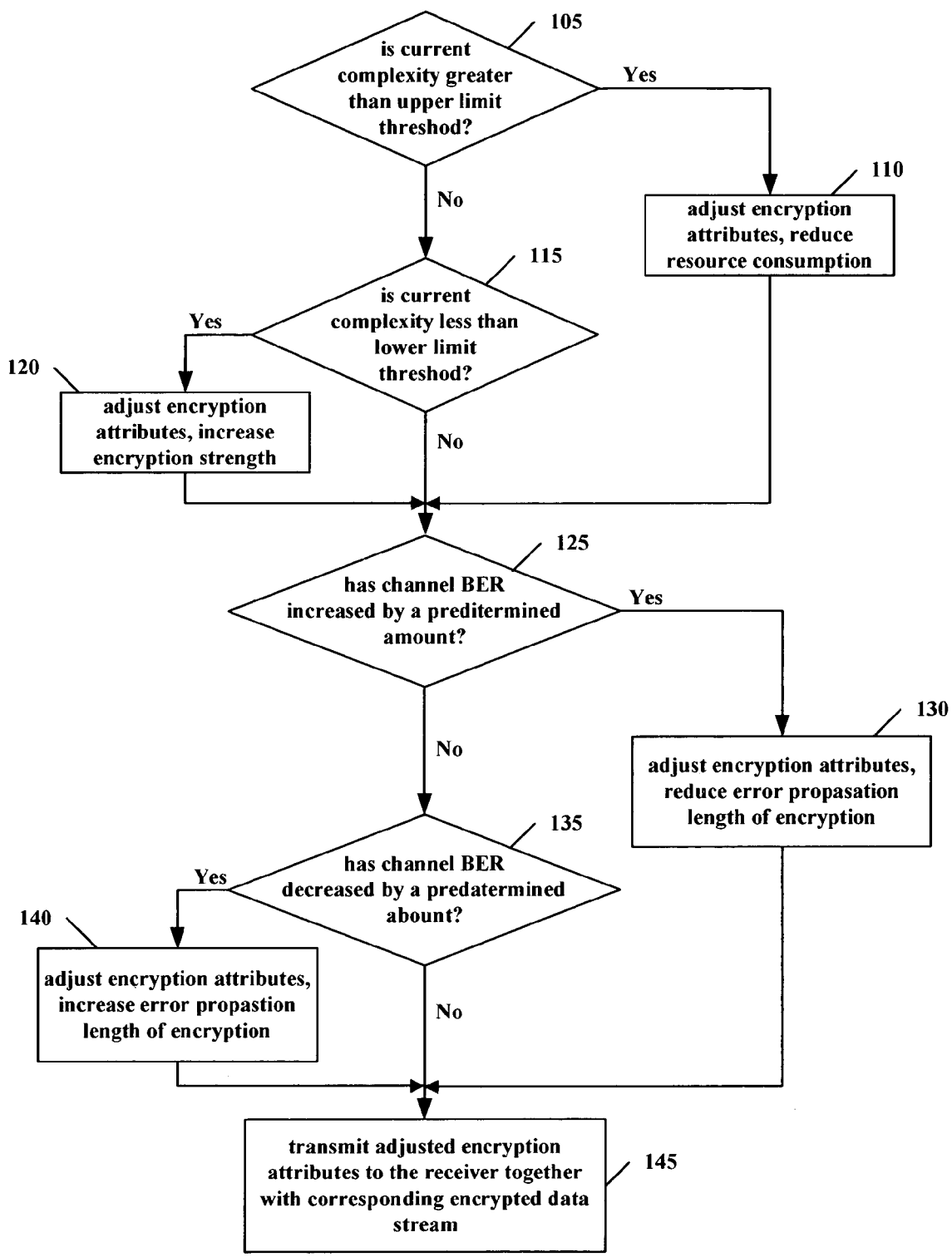
FIG. 1 is a flowchart showing a method for encrypting a data stream according to an embodiment of the present invention.

Next, detailed description will be given to advantageous embodiments of the present invention with reference to the drawings. FIG. 1 is a flowchart showing a method for encrypting a data stream according to an embodiment of the present invention. The process for encrypting and decrypting a data stream in prior art usually includes: first, an encryption policy is predetermined; then, the sender encrypts the whole data stream (Naive Algorithm) or a part of the data stream (Selective Algorithm) according to the policy and transmits the encrypted data stream to the receiver through a channel connecting the sender and the receiver; finally, the receiver decrypts the received data stream according to the predetermined encryption policy and reproduces the information carried by the data stream.

As shown in FIG. 1, according to the embodiment of the present invention, during the process of encryption and decryption of the data stream, a determination is made as to whether the current complexity is greater than an upper limit threshold at Step 105. In the present embodiment, the current complexity is a measure of resource consumption of the sender, the receiver or both. The current complexity may be the load of the processor or usage of the storage of the sender, or the load of the processor or usage of the storage of the receiver, or a comprehensive measure by taking account of the load of the processors and usage of the storages of both the sender and the receiver, according to the present embodiment.

If the measure of the current complexity includes the resource consumption of the receiver, the information about the resource consumption of the receiver, such as above mentioned processor's load and storage usage, needs to be fed back to the sender. Those skilled in the art may anticipate various ways to feed back this information, for example, by means of acknowledgment packets, a separate backward link or channel, etc., the present invention has no special limitation as long as the sender can obtain the information about the resource consumption of the receiver.

In cases wherein the receiver is a terminal device with a relatively weak processor and relatively small storage, such as a set top box, a mobile communication terminal or the like, preferably the current complexity mainly takes account of the resource consumption of the receiver, such as the load of the receiver's processor. Accordingly, the predetermined upper threshold may be, for example, 80% of the processor's maximum load.

If the determination result of Step 105 is "Yes" (for example, the processor's load of the receiver has exceeded 80%), then the process proceeds to Step 110, adjusting the encryption attributes to reduce the resource consumption. The encryption attributes in the present invention refer to those adjustable attributes related to encryption processing, such as encryption algorithm, encryption mode, encryption parameters, etc. There are many algorithms for data encryption known in the art, for example, DES, 3DES, AES, RC4, etc.; each of these algorithms has different encryption modes, such as ECB, CBC, OFB, etc.; and some of them also include encryption parameters, for example, in the encryption algorithm RC4, different lengths of encryption keys may be chosen by adjusting encryption parameters. Different encryption algorithms have different encryption strengths; furthermore, the same encryption algorithm may have different encryption strengths in different encryption modes or with encryption parameters. Accordingly, the algorithms with different strengths have different consumption of system resources (such as processor load, storage usage, and so on).

The present embodiment utilizes these encryption attributes to adjust the encryption strengths, thereby making the encryption of the data stream adapted to the condition of resource consumption at the receiver or the sender, and the condition of the channel (described later), so that a balance among the system resources, the data security (encryption strength) and the reproduction quality of the transmitted information can be reached. For example, in Step 110, the computation used by the encryption and decryption can be reduced through changing the encryption algorithm from "3DES" to "DES" or through shortening the length of the encryption key, as a result the resource consumption can be reduced.

Next, if the determination result in Step 105 is "No", the process proceeds to Step 115, determining whether the current complexity is less than a predetermined lower threshold. In this embodiment the lower threshold is 50% of the processor's maximum load.

Next, if the result of the determination at step 115 is "Yes", the process proceeds to Step 120, where the encryption attributes are adjusted to raise the encryption strength.

Through Steps 115 and 120, the method of the present embodiment fully utilizes the system resources to ensure data security. If the consumption of system resource is getting better, for example, when the processor's load of the receiver has reduced to be lower than 50%, the encryption attributes will be adjusted to raise the encryption strength.

Next, if the determination result in Step 115 is "No", or after Step 110 or Step 120, the process proceeds to Step 125, determining whether the channel's BER has increased by a predetermined value. If the determination result in Step 125 is "Yes", Step 130 will be performed, where the encryption attributes are adjusted to reduce error propagation length of the encryption.

If the determination result in Step 125 is "No", Step 135 will be performed, determining whether the channel's BER has decreased by a predetermined value. If the determination result in Step 135 is "Yes", Step 140 will be performed, where the encryption attributes are adjusted to increase error propagation length of the encryption.

In the present application, the error propagation length refers to the affected range in the decrypted data caused by an error in the encrypted data. Usually, the error propagation length may be adjusted through changing the encryption mode, for example, in Electronic Code Book (ECB) mode the data to be encrypted is divided into blocks, the size of each block is the same as the length of the encryption key, and each block is encrypted with the same encryption key, therefore the error propagation length of ECB is equal to the length of the encryption key, that is, one block. In Cipher Block Chaining (CBC) mode first the clear text is also divided into fixed-length (such as 64 bits) blocks, then an XOR operation is performed between the encrypted code output from the previous encrypted block and the next block of plain code to be encrypted, the result of the XOR operation is encrypted with the encryption key to produce the encrypted code, therefore the error propagation length is equal to the length of two blocks. Besides, other similar encryption modes, for example, Cipher Feedback Mode (CFB), Output Feedback Mode (OFB), etc., have different error propagation characteristics. In addition to the encryption modes, different encryption algorithms can also cause different error propagation lengths, for example, if an encryption algorithm like RC4 is used, the error propagation length would be very small, which is only equal to the error itself.

Generally, the greater the error propagation length is, that is, more strongly the encrypted data blocks are associated with each other, the more difficult it is to crack the data, so the security is better; at the same time, however, higher channel quality is required. During transmission, the method of the present embodiment adjusts the error propagation length based on the current channel quality, to balance among the channel quality, data security and the reproduction quality of the transmitted information.

Alternatively, at Step 135 and Steps 130, 140, the determination to adjust the encryption mode may be made by comparing the current BER of the channel with a set of predetermined thresholds, for example, when the current BER is 10E-4, CBC mode is chosen, and when the channel quality is getting worse and the current BER has increased to be 10E-3, ECB mode can be used to reduce the error propagation at the encryption layer.

As shown in FIG. 1, if the determination result in Step 135 is "No", or after Step 130 or 140, Step 145 will be performed, where the adjusted encryption attributes and corresponding encrypted data stream are transmitted to the receiver. If the encryption attributes have been adjusted, it is necessary to inform the receiver of the adjustment information, in order for the receiver to perform decryption correctly. In the present embodiment, the information of encryption attributes is recorded in the header of data packet for the data stream in the form of metadata; preferably the information of encryption attributes is also encrypted. The following Table 1 exemplarily shows the content in the encryption attribute information according to the present embodiment.

TABLE 1

Content of the encryption attribute information

| Field | Value |
|---|---|
| Encryption algorithm | 3DES |
| Encryption mode | CBC |
| Encryption parameter | Null |

Of course, many other approaches can be used to transmit the encryption attribute information from the sender to the receiver, the present invention is not limited to the above embodiment, for example, it is also possible to transmit the encryption attribute information to the receiver with a separate data packet or even via another channel.

With the above method of the present invention, during encryption, transmission and transmission, the encryption policy is adjusted according to the resource consumption and channel quality, and the data stream is adequately encrypted under the condition of ensuring the routine operation of the systems of the sender and the receiver, thus the optimal state of balance among the system performance, data security and quality of data reproduction may be achieved.

In addition, according to another embodiment of the present invention, there is provided a method suitable for encrypting a compressed video stream. Currently used video compression methods usually record video data as three kinds of frame data, that is, I-frame data, P-frame data and B-frame data. Among them, an I-frame (Intraframe) records an independent complete picture; a P-frame (Prediction Frame) only contains the difference between the picture of the present frame and the previously decompressed picture. a B-frame (Bi-directional Prediction frame) has the same principle as that of P-frame, but in addition to making reference to the previously decompressed picture, the subsequent uncompressed picture may be referenced too. Because it is not necessary to store the complete picture, storage space is highly saved. Generally, the order of frames in a MPEG data stream is IBBPBBBPBBPBBBPBBIBBPBBP . . .

From the point of view of data security, the relative importance of these three kinds of frame data is successively as I-frame>P-frame>B-frame. This is because, if only P-frame data or B-frame data are obtained without correctly decrypted I-frame data, the whole video stream cannot be correctly reproduced in any way. In the present embodiment, taking advantage of the features of a compressed video stream, the encryption attributes are adjusted with respect to the three kinds of frame data respectively, so that the data stream can be encrypted more efficiently.

Figure 2:
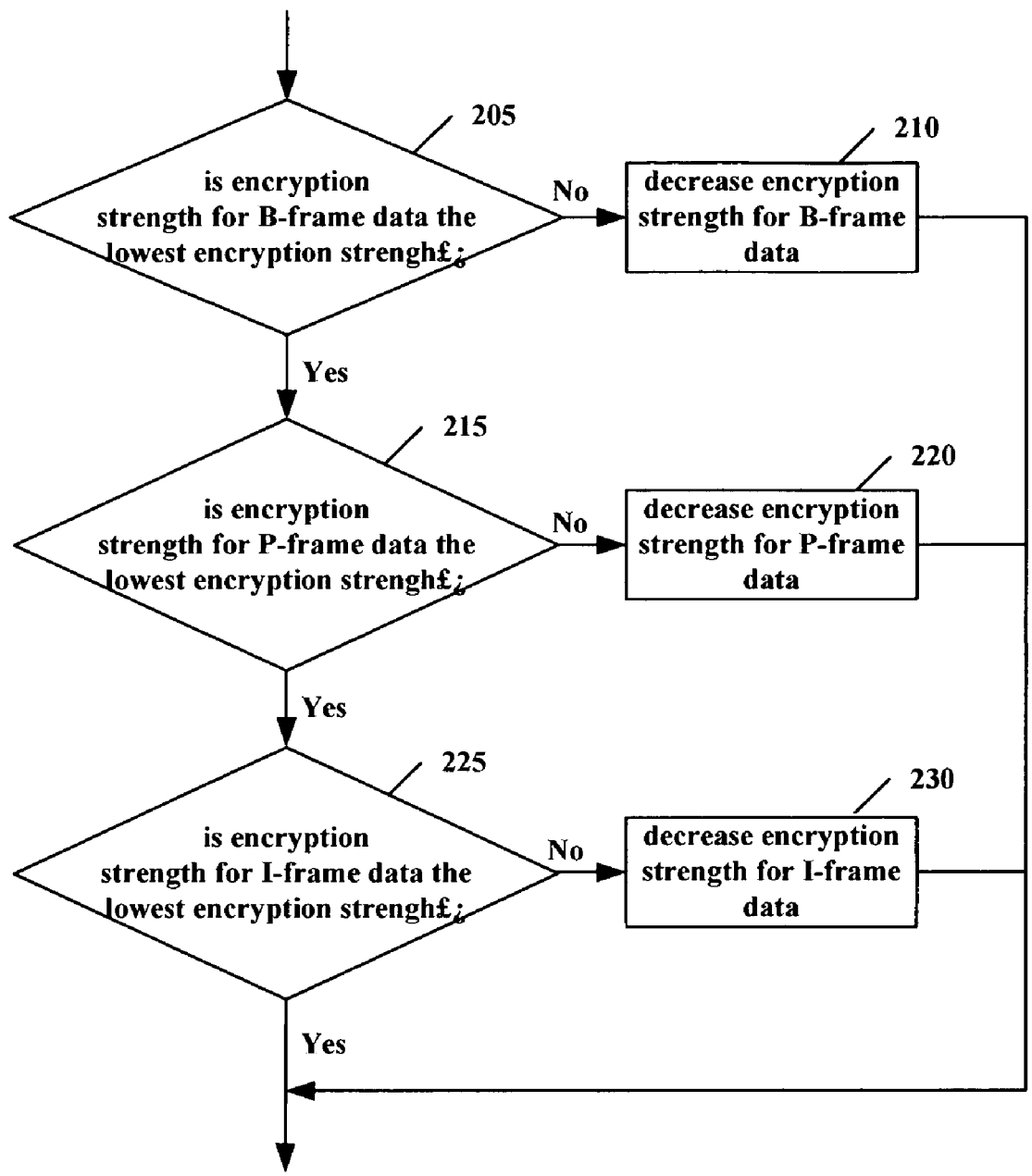
FIG. 2 is a flowchart showing steps of adjusting encryption attributes in a method for encrypting a data stream according to another embodiment of the present invention.

FIG. 2 is a flowchart showing the steps of adjusting encryption attributes in a method for encrypting a data stream according to another embodiment of the present invention. The differences between this embodiment and the previous embodiment are the step of adjusting the encryption attributes to reduce the resource consumption (i.e. Step 110 in FIG. 1) and the step of adjusting the encryption attributes to raise the encryption strength (i.e. Step 120 in FIG. 1). FIG. 2 shows the detailed flow of the step for adjusting the encryption attributes to reduce the resource consumption (Step 110) in the method for encrypting a data stream according to the present embodiment.

As shown in FIG. 2, if the determination result in Step 105 (FIG. 1) is "Yes", a determination is made first as to whether the encryption strength of the B-frame data has reached the lowest encryption strength at Step 205. If the determination result of Step 205 is "No", Step 210 will be performed to reduce the encryption strength of the B-frame data, then the following step of the method (Step 125 in FIG. 1) will be performed; if it is "Yes", Step 215 will be performed, determining whether the encryption strength of the P-frame data has reached the lowest encryption strength.

Then, if the determination result of Step 215 is "No", the process proceeds to Step 220, reducing the encryption strength of P-frame data, then the following step of the method (Step 125 in FIG. 1) will be performed; if it is "Yes", Step 225 will be performed, determining whether the encryption strength of the I-frame data has reached the lowest encryption strength.

Next, if the determination result of Step 225 is "No", Step 230 will be performed, reducing the encryption strength of I-frame data, then the following step of the method (Step 125 in FIG. 1) will be performed; if it is "Yes", it means that the encryption strengths for the data of all three types of frames have reached the lowest value. In that case, the encryption and transmission may wait till the system resources have been recovered or the process may be performed with the lowest encryption strengths.

Here, the encryption strength refers to the degree of difficulty for cracking the data encrypted according to particular encryption attributes, that is usually associated with the complexity of the encryption algorithm, the complexity of encryption mode, the complexity of the encryption key and the like, and the increase of encryption strength would usually lead to the increase of the consumption of system resources. The following Table 2 exemplarily shows a list of combinations of encryption methods and encryption modes commonly used in the prior art, and their comparison.

TABLE 2

A comparison of encryption strengths

| Strength Rank | 1 | 2 | 3 | 4 | 5 | 6 |
|---|---|---|---|---|---|---|
| Encryption Attributes | AES (CBC) | 3DES (CBC) | AES (ECB) | 3DES (ECB) | DES (CBC) | DES (ECB) |

In the present embodiment, the lowest encryption strengths may be set for different kinds of frame data respectively. Preferably the lowest encryption strengths for the I-frame data, P-frame data and B-frame data are getting lower successively. And the lowest encryption strength may be zero, that is, no encryption. For example, according to the setting of a preferred embodiment, the lowest encryption strength for I-frames is DES (CBC), the lowest encryption strength for P-frames is DES (ECB), and the lowest encryption strength for B-frames is "no encryption". Thus, in the cases of relatively large resource consumption, when the encryption strengths are all adjusted to be the lowest according to the method of the present embodiment, it is also possible to ensure sufficient protection for the I-frames that have high importance, thereby ensuring the security of the whole video data stream, in which case the system resource consumption for encryption is significantly reduced and the reproduction quality is ensured because of the reduction of the encryption strengths of P-frames and B-frames.

Figure 3:
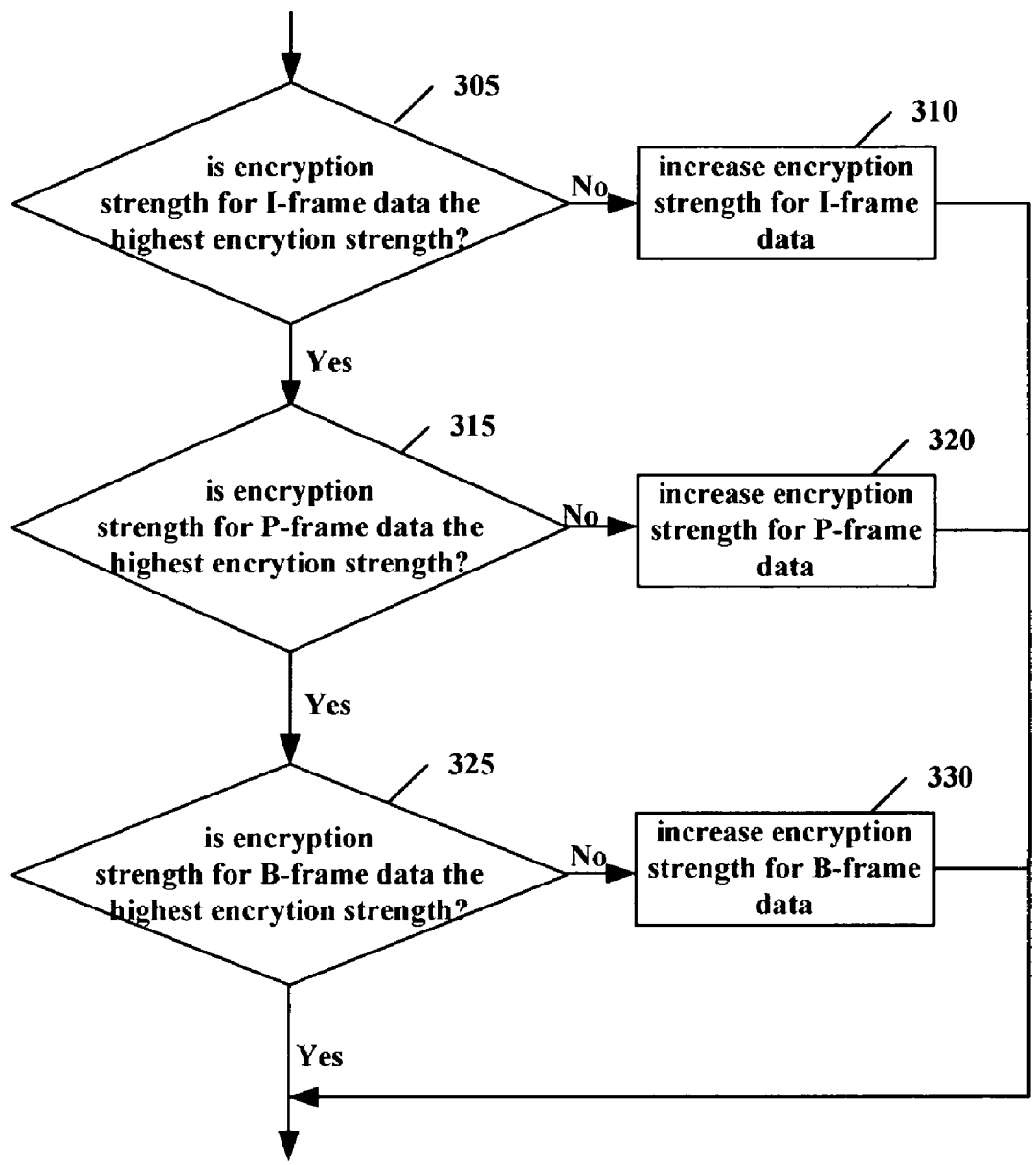
FIG. 3 is a flowchart showing steps of adjusting encryption attributes in a method for encrypting a data stream according to the another embodiment of the present invention.

FIG. 3 is a flowchart showing steps of adjusting encryption attributes in a method for encrypting a data stream according to the another embodiment of the present invention, particularly showing the detailed flow of the step for adjusting the encryption attributes to raise the encryption strength (Step 120) in a method for encrypting a data stream according to the present embodiment.

As shown in FIG. 3, if the determination result of Step 115 (FIG. 1) is "Yes", a determination will be made first as to whether the encryption strength of the I-frame data has reached the highest encryption strength at Step 305. If the determination result of Step 305 is "No", Step 310 will be performed, increasing the encryption strength of the I-frame data, then the following step of the method (Step 125 in FIG. 1) will be performed; if it is "Yes", Step 315 will be performed, determining whether the encryption strength of the P-frame data has reached the highest encryption strength.

Next, if the determination result of Step 315 is "No", Step 320 will be performed, increasing the encryption strength of P-frame data, then the following step of the method (Step 125 in FIG. 1) will be performed; if it is "Yes", Step 325 will be performed, determining whether the encryption strength of the B-frame data has reached the highest encryption strength.

Next, if the determination result of Step 325 is "No", Step 330 will be performed, increasing the encryption strength of B-frame data, then the following step of the method (Step 125 in FIG. 1) will be performed; if it is "Yes", it means that the encryption strengths of all three kinds of frame data have reached the highest values. In that case, the process just proceeds.

Similarly, the highest encryption strengths may also be set for the data of different frames, respectively, but in this embodiment the same highest encryption strength, such as AES (CBC), is set for the all frames.

Correspondingly, the following Table 3 exemplarily shows the content of the encryption attribute information according to the present embodiment.

TABLE 3

Content of the encryption attribute information

| Field | Value |
|---|---|
| Encryption algorithm for I-frames | 3DES |
| Encryption mode for I-frames | CBC |
| Encryption parameter for I-frames | Null |
| Encryption algorithm for P-frames | DES |
| Encryption mode for P-frames | CBC |
| Encryption parameter for P-frames | Null |
| Encryption algorithm for B-frames | Null |
| Encryption mode for B-frames | Null |
| Encryption parameter for B-frame | Null |

According to this embodiment, when the consumption of the system resources is getting alleviated, the encryption strengths may be increased in the order of the I-frame, the P-frame and the B-frame, thereby making the security of the encrypted data stream to be maximized within limit of the system resources.

Though different encryption algorithms are used for different types of video frames in the present embodiment, different encryption algorithms may also be used for the same type of video frames based on their importance in practice. For example, for P-frames, a P-frame located at a preceding position within a GOP (Group of Pictures) is more important that another P-frame located at a following position within the GOP, so the higher encryption strength can be used for the preceding P-frame within a GOP.

Besides, though in the present embodiment, the encryption attributes are adjusted according to the relative importance of I-frame, P-frame and B-frame, the adjustment is not limited to this way only. For example, the lowest encryption strength for I-frames is set to "no encryption", the lowest encryption strength for P-frames is set to DES (ECB), the lowest encryption strength for B-frames is set to DES (CBC); and the highest encryption strength for I-frames is set to "no encryption", the highest encryption strength for P-frames is set to 3DES (CBC), the highest encryption strength for B-frames is set to AES (CBC); at the same time, at the steps as shown in FIG. 2, the encryption strengths are increased in the order of B-frame>P-frame>I-frame. Thus, those receivers who have not got permission may see intermittent pictures, that is, I-frame, but cannot see the whole video, this is of advantage for those service providers who want to attract more users and to get reliable protection as well.

With the method of this embodiment, the encryption strengths may be adjusted more precisely for different portions of the data stream, so that the resource consumption and security can be balanced more optimally. Due to utilization of the dependent relationship among the types of frames in the compressed video stream, it is possible to reduce the amount of data to be encrypted significantly or reduce the compression strength for a large portion of the data significantly, thereby saving the system resources of both the receiver and the sender. Furthermore, by means of selecting different lowest and highest encryption strengths for the data of different frame types, various results may be achieved that are of advantage for the providers of the data stream.

According to still another embodiment of the present invention, there is provided a method suitable for encrypting a layered data stream. The technique of dividing the compressed data stream into layers is widely used in the art. For example, according to MPEG-2 and later standards a compressed data stream is divided into a base layer and one or more enhancement layer. Among them, the base layer provides a relatively low-resolution video and may be decoded and reproduced independently, and the enhancement layer provides higher resolution and needs to be decoded based on the base layer. In the case of having a plurality of enhancement layers (such as a first enhancement layer, a second enhancement layer and so on), decoding the enhancement layer of higher resolution depends on decoding the enhancement layer(s) of lower resolution. That is, the base layer may be decoded independently to reproduce the video of low quality; the first enhancement layer may be decoded on the basis of the decoded base layer, to get higher resolution; further, the second enhancement layer may be decoded on the basis of the decoded first enhancement layer, to get still higher video reproduction quality, and so on. Thus, from the point of view of security, the base layer has the highest importance, then the first enhancement layer, the second enhancement layer and so on. The method of this embodiment takes advantage of the features of such layered data stream, adjusting encryption strengths for different layers respectively.

The differences between this embodiment and the preceding embodiment of FIG. 1 are the step of adjusting the encryption attributes to reduce resource consumption (i.e. Step 110 in FIG. 1) and the step of adjusting the encryption attributes to increase the encryption strength (i.e. Step 120 in FIG. 1).

Figure 4:
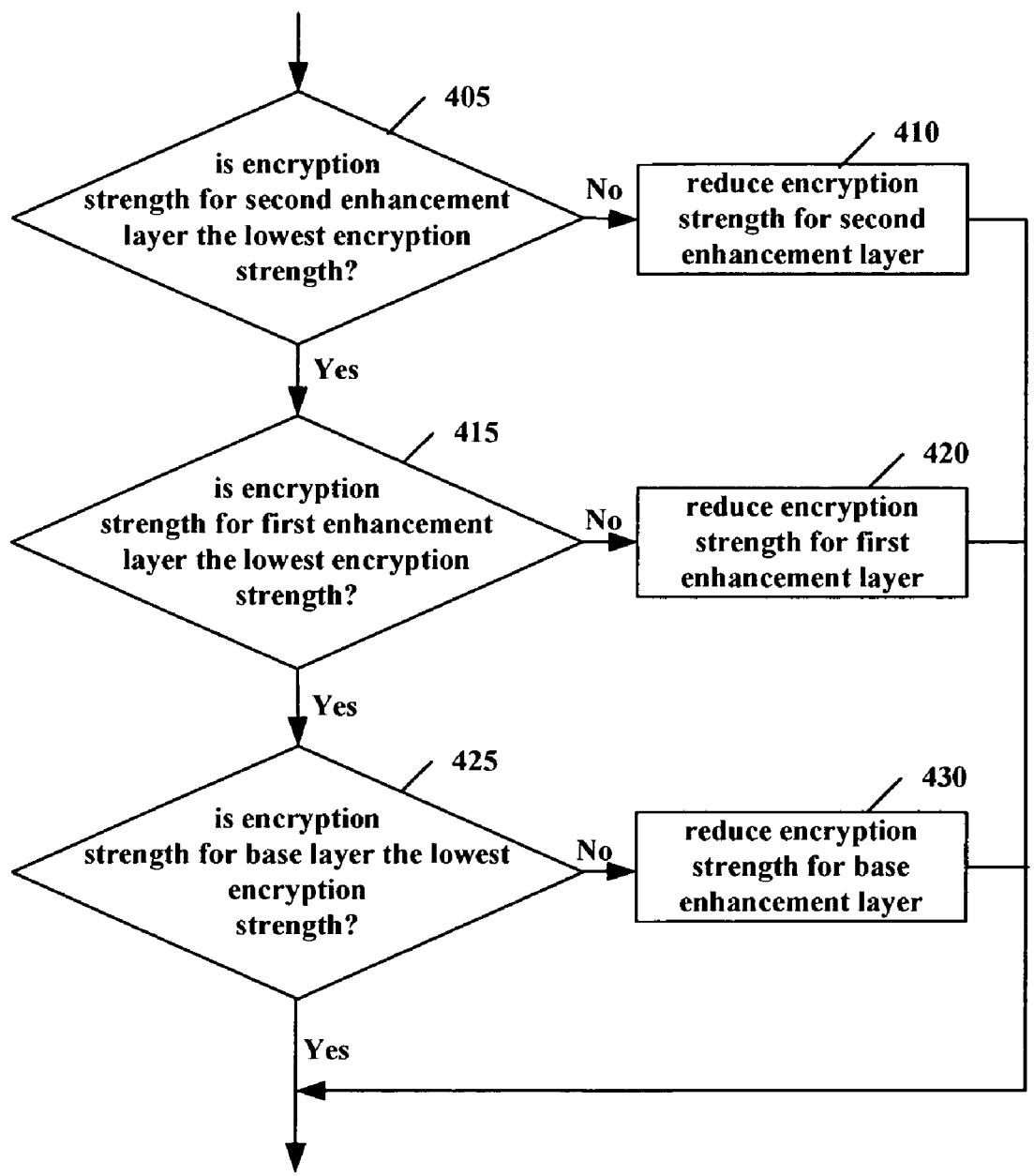
FIG. 4 is a flowchart showing steps of adjusting encryption attributes in a method for encrypting a data stream according to still another embodiment of the present invention.

FIG. 4 is a flowchart showing steps of adjusting encryption attributes in a method for encrypting a data stream according to still another embodiment of the present invention, particularly showing the detailed flow of the step for adjusting the encryption attributes to reduce the encryption strength (Step 110). It is assumed that the data stream has three layers, i.e. basic layer, first enhancement layer and second enhancement layer.

As shown in FIG. 4, if the determination result of Step 105 (FIG. 1) is "Yes", a determination is made first as to whether the encryption strength of the second enhancement layer has reached the lowest encryption strength at Step 405. If the determination result of Step 405 is "No", Step 410 will be performed, reducing the encryption strength of the second enhancement layer, then the following step of the method (Step 125 in FIG. 1) will be performed; if it is "Yes", Step 415 will be performed, determining whether the encryption strength of the first enhancement layer has reached the lowest encryption strength.

If the determination result in Step 415 is "No", Step 420 will be performed, reducing the encryption strength of the first enhancement layer, then the following step of the method (Step 125 in FIG. 1) will be performed; if it is "Yes", Step 425 will be performed, determining whether the encryption strength of the base layer has reached the lowest encryption strength.

Next, if the determination result in Step 425 is "No", Step 430 will be performed, reducing the encryption strength of the base layer, then the following step of the method (Step 125 in FIG. 1) will be performed; if it is "Yes", it means that the encryption strengths of all layers have reached the lowest value. In that case, the process of encryption and transmission may halt till the system resources are released by other applications or may proceed with the lowest encryption strengths.

In this embodiment, the lowest encryption strengths may be set for different layers respectively, preferably the lowest encryption strength for the base layer is set to the highest, the lowest encryption strength for the first enhancement layer is set to the second highest, and the lowest encryption strength for the second enhancement layer is the lowest. Besides, the lowest encryption strength may be zero, that is, no encryption. For example, the lowest encryption strength for the base layer is DES (CBC), the lowest encryption strength for the first enhancement layer is DES (ECB), and the lowest encryption strength for the second enhancement layer is "no encryption". Thus, in the cases of relatively large resource consumption, when the encryption strengths are all adjusted to be the lowest according to the method of the present embodiment, sufficient protection for the base layer of high importance is still guaranteed, thereby ensuring the security of the whole video stream, while the system resource consumption can be significantly reduced and the reproduction quality may be ensured due to the reduction of the encryption strengths of the first and second enhancement layers.

Figure 5:
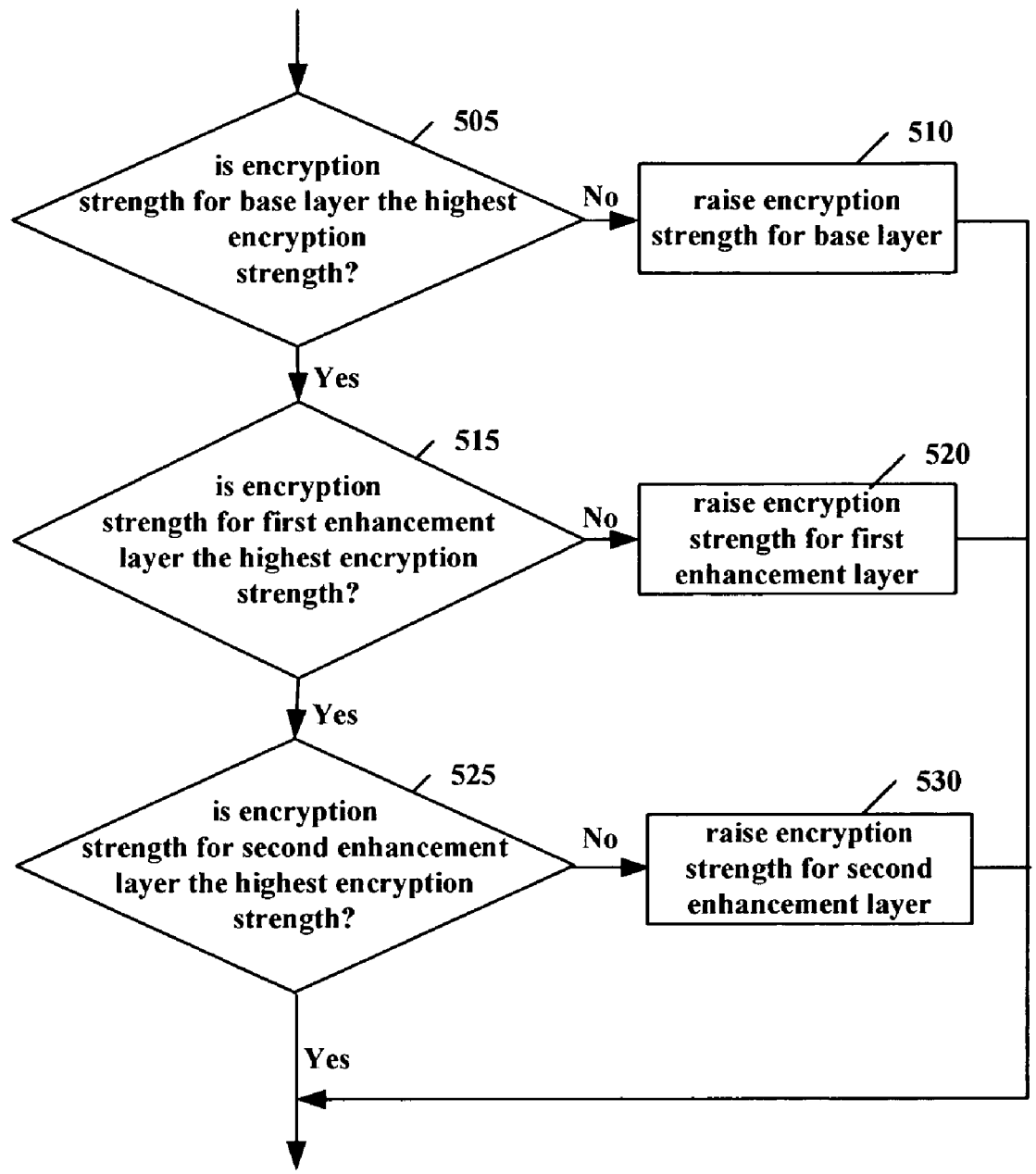
FIG. 5 is a flowchart showing steps of adjusting encryption attributes in a method for encrypting a data stream according to the still another embodiment of the present invention.

FIG. 5 is a flowchart showing steps of adjusting encryption attributes in a method for encrypting a data stream according to still another embodiment of the present invention, particularly showing the detailed flow of the step for adjusting the encryption attributes to increase the encryption strength (Step 120) in the method for encrypting a data stream.

As shown in FIG. 5, if the determination result in Step 115 (FIG. 1) is "Yes", a determination is made first as to whether the encryption strength of the base layer has reached the highest encryption strength in Step 505. If the determination result in Step 505 is "No", Step 510 will be performed, increasing the encryption strength of the base layer, then the following step of the method (Step 125 in FIG. 1) will be performed; if it is "Yes", Step 515 will be performed, determining whether the encryption strength of the first enhancement layer has reached the highest encryption strength.

Next, if the determination result of Step 515 is "No", Step 520 will be performed, increasing the encryption strength of the first enhancement layer, then the following step of the method (Step 125 in FIG. 1) will be performed; if it is "Yes", Step 525 will be performed, determining whether the encryption strength of the second enhancement layer has reached the highest encryption strength.

Next, if the determination result of Step 525 is "No", Step 530 will be performed, increasing the encryption strength of the second enhancement layer, then the following step of the method (Step 125 in FIG. 1) will be performed; if it is "Yes", it means that the encryption strengths of all layers have reached the highest values. In that case, the process may just proceed.

Similarly, the highest encryption strengths can also be set for different layers, respectively, but in the present embodiment the same highest encryption strength, such as AES (CBC), is set for all layers.

Correspondingly, the following Table 4 exemplarily shows the content of the encryption attribute information in this embodiment.

TABLE 4

Content of the encryption attribute information

| Field | Value |
| --- | --- |
| Encryption algorithm for the base layer | 3DES |
| Encryption mode for the base layer | CBC |
| Encryption parameter for the base layer | Null |
| Encryption algorithm for the first enhancement layer | DES |
| Encryption mode for the first enhancement layer | CBC |
| Encryption parameter for the first enhancement layer | Null |
| Encryption algorithm for the second enhancement layer | Null |
| Encryption mode for the second enhancement layer | Null |
| Encryption parameter for the second enhancement layer | Null |

According to the present embodiment, when the consumption of the system resources is getting alleviated, the encryption strengths may be raised in the order of the base layer, the first enhancement layer and the second enhancement layer, thereby maximizing the security of the data stream within the limit of the system resources.

Besides, according to an alternative embodiment, in the steps as shown in FIG. 4, the encryption strengths are reduced in the order of the base layer, the first enhancement layer and the second enhancement layer; in the steps as shown in FIG. 5, the encryption strengths are raised in the order of the second enhancement layer, the first enhancement layer and the base layer; the lowest encryption strengths of the base layer, the first enhancement layer and the second enhancement layer are set to "no encryption", DES (ECB) and 3DES (CBC), respectively; and the highest encryption strengths of the base layer, the first enhancement layer and the second enhancement layer are set to "no encryption", AES (CBC) and AES (CBC) respectively. Thus, those receivers who have no permission may see reproduced video of low resolution, meanwhile, the enhancement layers that can provide reproduced video of high quality are adequately protected, this is of advantage for those service providers who want to attract more users and to get reliable protection as well.

Besides, according to still another embodiment, there is provided a method suitable for encrypting a layered compressed video stream. For example, a MPEG-2 video data stream includes a base layer and one or more enhancement layers, while each layer contains I-frame, P-frame and B-frame data. Therefore, the present embodiment combines the embodiments described with reference to FIGS. 2 and 3 and FIGS. 4 and 5, providing an encryption method that can adjust encryption strengths for different layers and also can adjust encryption strengths for different frames in the same layer.

Particularly, in Steps 410, 420 and 430 as shown in FIG. 4, the process as shown in FIG. 2 is performed with respect to the base layer, the first enhancement layer and the second enhancement layer, respectively; in Steps 510, 520 and 530 as shown in FIG. 5, the process as shown in FIG. 3 is performed with respect to each type of frames within the base layer, the first enhancement layer and the second enhancement layer, respectively; in addition, when the encryption strengths for all types of frames within a layer have reached the lowest value, the encryption strength of this layer is determined to be the lowest (Steps 405, 415 and 425), on the other hand, when the encryption strengths for all types of frames within a layer have reached the highest value, the encryption strength of this layer is determined to be the highest (Steps 505, 515 and 525).

For the layered compressed video stream, the method for encrypting of the present embodiment not only can adjust encryption strengths with respect to different layers, but also can adjust the encryption strengths with respect to different types of frame within the same layer, so that the encryption attributes can be adjusted more flexibly and more accurately, realizing a balance among the system resources, data security and the reproduction quality of the transmitted information. As a result, the method of this embodiment can improve the efficiency of the system operation and maximize the quality of reproduction.

Besides, according to the other aspects of the present invention, there is provided an apparatus for encrypting and decrypting a data stream, an apparatus for securely sending a data stream and an apparatus for securely receiving a data stream, as well as a system for secure transmission of a data stream. Following is a detailed description with reference to FIGS. 6 and 7.

Figure 6:
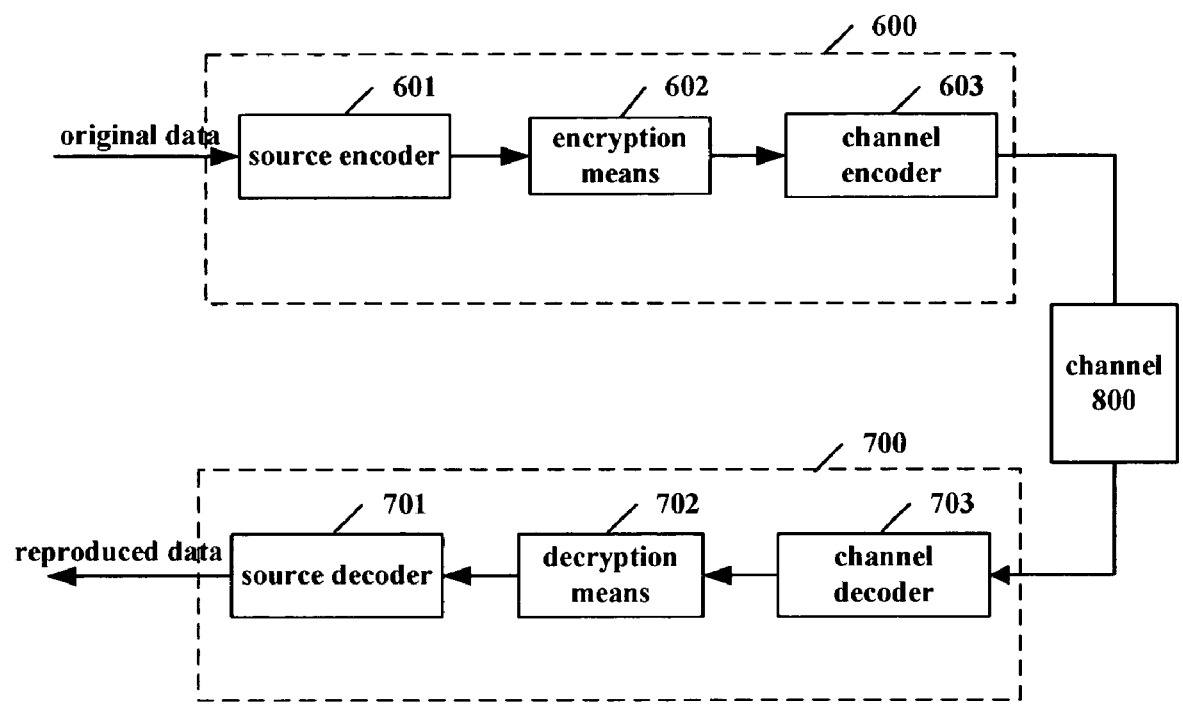
FIG. 6 schematically shows the structure of the system for secure transmission of data stream in the prior art.

FIG. 6 schematically shows the structure of the system for secure transmission of a data flow in the prior art. As shown in FIG. 6, the system includes: a sending apparatus (sender) 600, a receiving apparatus (receiver) 700 and a channel 800 connecting the receiver and the sender. The sender 600 comprises a source encoder 601, an encryption means 602 and a channel encoder 603; the receiver 700 comprises a source decoder 701, a decryption means 702 and a channel decoder 703.

The secure transmission of a data stream in the prior art is as follows: at the sender, first the original data (such as audio, video or other data) are source-encoded by the source encoder 601, for example, those original video data are compressed and encoded into a data stream in MPEG2 format, or those speech data are compressed and encoded into a data stream in MP3 format, and so on. Here, the original data stream may come from a video capture card or other data acquisition devices, also may come from a reading device for data recording medium, such as a CD drive, a DVD drive, a disk drive and the like. And when the data in a proper format have been saved in the recording medium, the source encoder 601 can be omitted. Next, according to a certain encryption policy, the encryption means 602 encrypts the data stream, here the encryption policy may be predetermined, or determined through "shake-hands" before the encryption and transmission. Finally, the encrypted data stream is channel-encoded by the channel encoder 603 and transmitted to the receiving means 700 through the channel 800.

At the receiver, first the received data are channel-decoded by the channel decoder 703, forming received data stream. Then, according to the above encryption policy, the decryption means decrypts the received data stream. Finally, the source decoder 701 source-decode the decrypted data stream, to form reproduced data.

Figure 7:
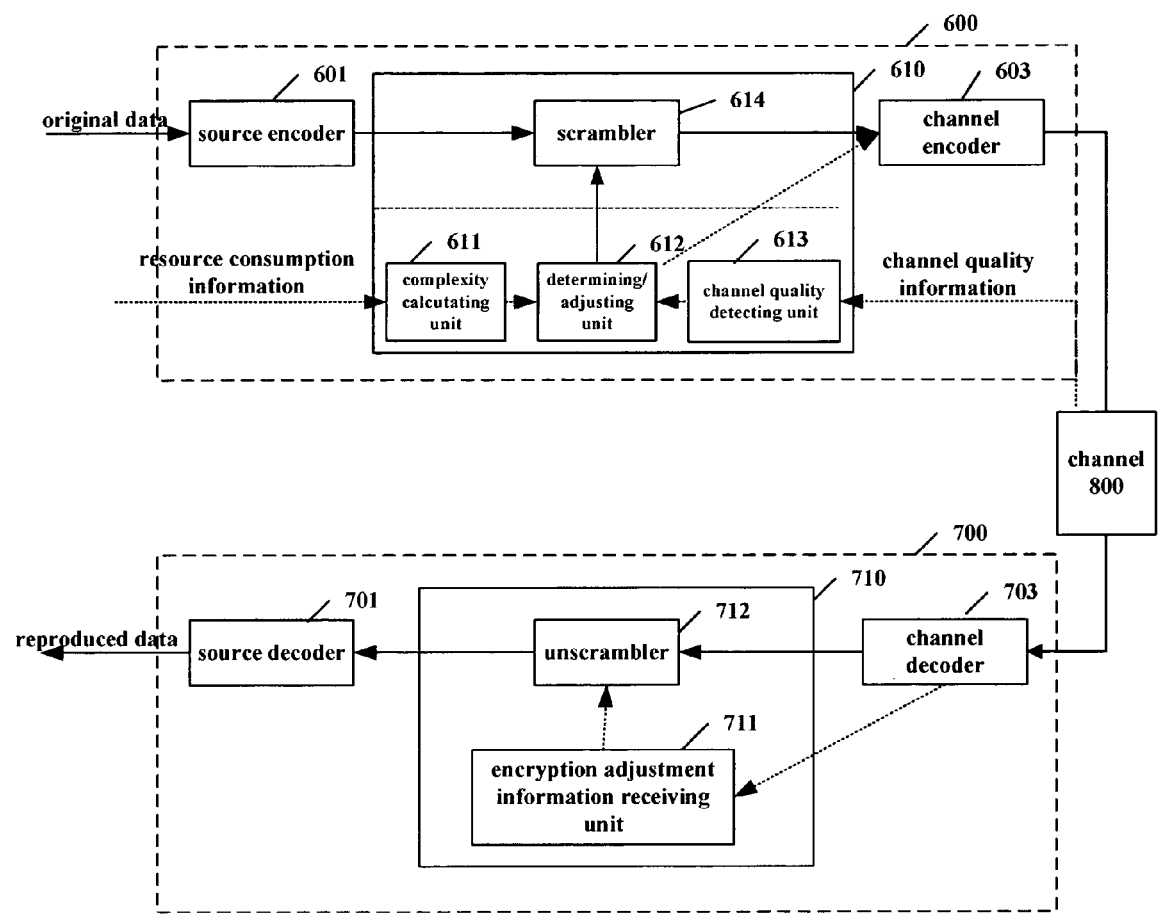
FIG. 7 schematically shows a structure of a system for secure transmission of data stream according to an embodiment of the present invention.

FIG. 7 schematically shows a structure of a system for secure transmission of a data stream according to an embodiment of the present invention. As shown in FIG. 7, the system for secure transmission of a data stream comprises: a sending apparatus (sender) 600, a receiving apparatus (receiver) 700 and a channel 800 connecting the receiver and the sender. Among them, the sender 600 comprises a source encoder 601, an encryption apparatus 610 and a channel encoder 603; the receiver 700 comprises a source decoder 701, a decryption apparatus 710 and a channel decoder 703.

According to this embodiment, in the sender 600, during the encryption apparatus 610 encrypts the data stream coming from the source encoder 601 or from a reading device for data recording medium (not shown), and transmits the encrypted data stream to the channel encoder 602, that is, during the process of encryption and transmission of the data stream, the encryption policy is adjusted based on the condition of resource consumption and channel quality.

The encryption apparatus 610 includes a scrambler 614 for encrypting a data stream according to specific encryption attributes; a complexity calculating unit 611 for calculating the complexity according to the resource consumption of the sender and the receiver (the term "complexity" has been explained in above description); a channel quality detecting unit 613 for detecting the current quality of the channel 800 used for transmitting the data stream, such as Bit Error Rate (BER), Packet Lose Rate (PLR), band width and the like, and for sending the detected channel quality data to a determining and adjusting unit 612; the determining and adjusting unit 612 for determining whether it is needed to adjust the encryption attributes based on the information from complexity calculating unit 611 and the channel quality detecting unit 613, and if it is needed, adjusting the encryption attributes for the data stream and transferring the adjusted encryption attributes to the scrambler 614, thereby controlling the scrambler 614 to perform encryption. Specifically, the determining and adjusting unit 612 performs the steps of determining and adjusting as shown above in the flowchart of FIG. 1. The determining and adjusting unit 612 may be implemented in the form of hardware or software corresponding to the steps of the flow, as known to those skilled in the art.

The determining and adjusting unit 612, complexity calculating unit 611 and channel quality detecting unit 613 form the encryption attribute adjusting means for performing the adjustment of encryption policy based on the resource consumption and channel quality during the encryption and transmission of the data stream, in this embodiment of the present invention.

According to this embodiment, the adjusted attribute information is recorded in the header of the data packet in the form of metadata and transmitted to the receiver (receiving means 700) together with the data stream; preferably the encryption attribute information is also encrypted. The content of the encryption attribute information according to this embodiment is exemplarily shown in above Table 1.

In the receiver 700, the channel decoder 703 performs channel decoding of the received data to form a received data stream. The encryption attribute information in the header of the packets of the data stream is transferred to and extracted by the encryption adjustment information receiving unit 711, and then the extracted information is transferred to the unscrambler 712, controlling the unscrambler to decrypt the corresponding data of the data stream in a proper manner.

It should be noted that the method for transmitting then encryption attributes is not limited to metadata in the above embodiment, and it is also possible for the encryption attributes to be transmitted via a separate secure channel, accordingly, the encryption adjustment information receiving unit 711 needs to receive encryption attributes information from the secure channel, which is also within the scope of the present invention.

Further, according to another embodiment of the present invention, when the data stream to be encrypted and transmitted is a compressed video stream containing I-frame data, P-frame data and B-frame data, the determining and adjusting unit 612 adjusts the encryption attributes for the I-frame data, P-frame data and B-frame data, respectively; the scrambler 614 encrypts the I-frame data, P-frame data and B-frame data, respectively, according to the encryption attribute information. Specifically, determining and adjusting unit 612 performs the steps of checking and adjusting as shown in FIGS. 2 and 3. The content of the encryption attribute information according to the present embodiment is exemplarily shown in above Table 3.

Accordingly, the encryption adjustment information receiving unit 711 of the present embodiment receives the encryption attributes information for the I-frame data, P-frame data and B-frame data respectively; the unscrambler 712 decrypts the I-frame data, P-frame data and B-frame data, respectively, according to the encryption attribute information.

Furthermore, according to still another embodiment of the present invention, when the data stream to be encrypted and transmitted is a compressed video stream containing a base layer, a first enhancement layer and a second enhancement layer, the determining and adjusting unit 612 adjusts the encryption attributes for the base layer, the first enhancement layer and the second enhancement layer, respectively; the scrambler 614 encrypts the base layer, the first enhancement layer and the second enhancement layer, respectively, according to the encryption attribute information. Specifically, the determining and adjusting unit 612 performs the steps of determining and adjusting as shown in FIGS. 4 and 5. The content of the encryption attribute information according to the present embodiment is exemplarily shown in above Table 4.

Accordingly, the encryption adjustment information receiving unit 711 of the present embodiment receives the encryption attribute information for the base layer, the first enhancement layer and the second enhancement layer respectively; the unscrambler 712 decrypts the base layer, the first enhancement layer and the second enhancement layer, respectively, according to the encryption attribute information.

Those skilled in the art should appreciate that, in the above embodiments, the components of the encryption and decryption apparatus and the sender and receiver, such as the source encoder 601, the encryption apparatus 610 and the channel encoder 603, the source decoder 701, the decryption apparatus 710 and the channel decoder 703, may be implemented in the form of hardware or software.

Besides, though a sender 600 and a receiver 700 are shown in the system as shown in FIG. 7, those skilled in the art may easily anticipate a system with one sending means and a plurality of receiving means, for example, in a VOD system, a VOD server provides service to a plurality of VOD terminals.

Though a detailed description has been given to the method for encryption and decryption, the apparatus for encrypting and decrypting, the apparatus for securely sending a data stream, the apparatus for securely receiving a data stream and a system for secure transmission of a data stream of the present invention through some exemplary embodiments, the above-mentioned embodiments are not exhausted, those skilled in the art may make various changes and modifications within the spirit and scope of the present invention. Therefore, the present invention is not limited to these embodiments; the scope of the invention is only defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An encryption method comprising a step of encrypting and transmitting a data stream from a sender to a receiver via a channel after at least a part of said data stream is encrypted, said step of encrypting and transmitting comprising:
    adjusting encryption attributes during transmission based upon a complexity consideration of a situation of the sender, the receiver and the channel;
    encrypting the data stream according to the adjusted encryption attributes; and transmitting said encrypted data stream and information of said encryption attributes to said receiver, wherein said step of adjusting encryption attributes comprises:
    determining whether there is a need to adjust said encryption attributes based on quality of the channel; if so, adjusting the encryption attributes wherein said step of adjusting encryption attributes comprises:
    determining whether current BER of the channel has increased by a first predetermined amount;
    if said current BER of the channel has increased by the first predetermined amount, adjusting the encryption attributes to reduce an error propagation length of the encryption;
    determining whether the current BER of the channel has decreased by a second predetermined amount; and
    if said current BER of the channel has decreased by the second predetermined amount, adjusting the encryption attributes to increase the error propagation length of the encryption.

2. The method for encrypting of claim 1, wherein said step of adjusting encryption attributes comprises:
    determining whether it is needed to adjust said encryption attributes based on current resource consumption of the sender, the receiver or both; if so, adjusting the encryption attributes.

3. The method for encrypting of claim 2, wherein said step of adjusting encryption attributes comprises:
    determining whether current complexity is greater than a first predetermined threshold, said current complexity is a measure of the resource consumption of the sender, the receiver or both; and
    if said current complexity is greater that said first predetermined threshold, adjusting the encryption attributes to reduce the resource consumption of the sender or the receiver.

4. The method for encrypting of claim 3, wherein said step of adjusting encryption attributes comprises:
    determining whether the current complexity is less than a second predetermined threshold, the second predetermined threshold is less than said first predetermined threshold; and
    if said current complexity is less than said second predetermined threshold, adjusting the encryption attributes to increase the resource consumption of the sender or the receiver.

5. The method for encrypting of claim 4, wherein said data stream is a compressed video stream containing I-frame data, P-frame data and B-frame data; and wherein said step of adjusting the encryption attributes to increase the resource consumption of said sender or said receiver includes respectively adjusting the encryption attributes for I-frame data, P-frame data and B-frame data in the order of I-frame, P-frame and B-frame.

6. The method for encrypting of claim 4, wherein said data stream contains a base layer and at least one enhancement layer, wherein said step of adjusting the encryption attributes to increase the resource consumption of said sender or said receiver includes respectively adjusting the encryption attributes for said base layer and said at least one enhancement layer in the order of from said base layer to said enhancement layer.

7. The method for encrypting of claim 3, wherein said data stream is a compressed video stream containing I-frame data, P-frame data and B-frame data, and wherein said step of adjusting the encryption attributes to reduce the resource consumption of said sender or said receiver includes respectively adjusting the encryption attributes for the I-frame data, P-frame data and B-frame data in the order of B-frame, P-frame and I-frame.

8. The method for encrypting of claim 3, wherein said data stream contains a base layer and at least one enhancement layer, wherein said step of adjusting the encryption attributes to reduce the resource consumption of said sender or said receiver includes successively adjusting the encryption attributes in the order of from said enhancement layer to said base layer.

9. The method for encrypting of claim 1, wherein said step of adjusting encryption attributes comprises:
   determining whether current BER of the channel is greater that a first predetermined threshold;
   if said current BER of the channel is greater than the first predetermined threshold, adjusting the encryption attributes to reduce the error propagation length of the encryption;
   determining whether the current BER of the channel is smaller than a second predetermined threshold;
   if said current BER of the channel is greater than the first predetermined threshold, adjusting the encryption attributes to reduce the error propagation length of the encryption.

10. The method for encrypting of claim 1, wherein said data stream is a compressed video stream containing I-frame data, P-frame data and B-frame data, said step of adjusting encryption attributes adjusts the encryption attributes for the I-frame data, P-frame data and B-frame data respectively.

11. The method for encrypting of claim 1, wherein said data stream contains a base layer and at least one enhancement layer, said step of adjusting the encryption attributes adjusts the encryption attributes for said base layer and said at least one enhancement layer, respectively.

12. A decryption method comprising decrypting and transmitting a data stream transmitted from a sender to a receiver via a channel after at least a part of said data stream is encrypted according to a particular set of encryption attributes, said step of decrypting and transmitting comprising:
   receiving adjusted encryption attributes taken from a plurality of attribute sets during reception of the encrypted data stream based upon a complexity consideration of a current situation of the sender, the receiver and the channel, wherein adjusting encryption attributes comprises:
   determining whether there is a need to adjust said encryption attributes based on quality of the channel; if so, adjusting the encryption attributes wherein said step of adjusting encryption attributes comprises:
   determining whether current BER of the channel has increased by a first predetermined amount;
   if said current BER of the channel has increased by the first predetermined amount, adjusting the encryption attributes to reduce an error propagation length of the encryption;
   determining whether the current BER of the channel has decreased by a second predetermined amount; and
   if said current BER of the channel has decreased by the second predetermined amount, adjusting the encryption attributes to increase the error propagation length of the encryption; and
   decrypting the data stream according to said adjusted encryption attributes.

13. The method for decrypting of claim 12, wherein said data stream is a compressed video stream containing I-frame data, P-frame data and B-frame data, said step of decrypting includes decrypting said I-frame data, P-frame data and B-frame data, respectively, according to said encryption attributes.

14. The method for decrypting of claim 12, wherein said data stream contains a base layer and at least one enhancement layer, said step of decrypting includes decrypting said base layer and said at least one enhancement layer, respectively, according to said encryption attributes.

15. An apparatus for encrypting a data stream that is transmitted from a sender to a receiver via a channel after at least a part of said data stream is encrypted according to a particular set of encryption attributes, said apparatus for encrypting comprising:
   encryption attribute adjusting means for adjusting encryption attributes taken from a plurality of attribute set during transmission of the data stream to generate encryption attribute information based upon complexity consideration of a current situation of the sender, the receiver and the channel, wherein adjusting encryption attributes comprises:
   determining whether there is a need to adjust said encryption attributes based on quality of the channel; if so, adjusting the encryption attributes wherein said step of adjusting encryption attributes comprises:
   determining whether current BER of the channel has increased by a first predetermined amount;
   if said current BER of the channel has increased by the first predetermined amount, adjusting the encryption attributes to reduce an error propagation length of the encryption;
   determining whether the current BER of the channel has decreased by a second predetermined amount; and
   if said current BER of the channel has decreased by the second predetermined amount, adjusting the encryption attributes to increase the error propagation length of the encryption; and
   a scrambler for performing encryption of said at least part of the data stream according to the encryption attributes adjusted by said encryption attribute adjusting means.

16. The apparatus for encrypting of claim 15, wherein said encryption attribute adjusting means includes:
   a complexity calculating unit for calculating current complexity based on resource consumption of the sender, the receiver or both; and
   a determining and adjusting unit for adjusting the encryption attributes based on the current complexity calculated by said complexity calculating unit to generate the encryption attribute information.

17. The apparatus for encrypting of claim 15, wherein said data stream is a compressed video stream containing I-frame data, P-frame data and B-frame data; said encryption attribute adjusting means adjusts the encryption attributes for the I-frame data, P-frame data and B-frame data, respectively; said scrambler encrypts the I-frame data, P-frame data and B-frame data, respectively, according to the encryption attribute information.

18. The apparatus for encrypting of claim 15, wherein said data stream contains a base layer and at least one enhancement layer; said encryption attribute adjusting means adjusts the encryption attributes for said base layer and said at least one enhancement layer respectively; said scrambler encrypts said base layer and said at least one enhancement layer respectively according to the encryption attribute information.

19. The apparatus for encrypting of claim 15, wherein said apparatus is employed for sending a data stream in security.

20. An apparatus for decrypting a data stream that is transmitted from a sender to a receiver via a channel after at least a part of which is encrypted, said apparatus for decrypting comprising:
  an encryption adjustment information receiving unit for receiving encryption attribute information from the sender, wherein said encryption adjustment information is generated based upon a complexity consideration of a current situation of the sender, the receiver and the channel, wherein adjusting encryption attributes comprises:
  determining whether there is a need to adjust said encryption attributes based on quality of the channel; if so, adjusting the encryption attributes wherein said step of adjusting encryption attributes comprises:
  determining whether current BER of the channel has increased by a first predetermined amount;
  if said current BER of the channel has increased by the first predetermined amount, adjusting the encryption attributes to reduce an error propagation length of the encryption;
  determining whether the current BER of the channel has decreased by a second predetermined amount; and
  if said current BER of the channel has decreased by the second predetermined amount, adjusting the encryption attributes to increase the error propagation length of the encryption; and
  an unscrambler for performing decryption of said data stream according to the encryption attribute information received by said encryption adjustment information receiving unit.

21. The apparatus for decrypting of claim 20, wherein said data stream is a compressed video stream containing I-frame data, P-frame data and B-frame data; said encryption adjustment information receiving unit receives the encryption attribute information for the I-frame data, P-frame data and B-frame data, respectively; said unscrambler decrypts the I-frame data, P-frame data and B-frame data, respectively, according to the encryption attribute information.

22. The apparatus for decrypting of claim 20, wherein said data stream contains a base layer and at least one enhancement layer; said encryption adjustment information receiving unit receives the encryption attribute information for said base layer and said at least one enhancement layer, respectively; said unscrambler decrypts said base layer and said at least enhancement layer, respectively, according to the encryption attribute information.

23. The apparatus for decrypting of claim 20, wherein said apparatus is employed for receiving a data stream in security.

24. A system for secure transmission of a data stream, comprising:
  an apparatus for encrypting a data stream that is transmitted from a sender to a receiver via a channel after at least a part of which is encrypted, said apparatus for encrypting comprising:
  encryption attribute adjusting means for adjusting encryption attributes during transmission of the data stream to generate encryption attribute information based upon a complexity consideration of a situation of the sender, the receiver and the channel between them, wherein said adjusting encryption attributes comprises:
  an unscrambler for performing decryption of said data stream according to the encryption attribute information received by said adjustment information receiving unit; and
  a channel connecting said apparatus for sending a data stream and said apparatus for receiving a data stream.

25. An article of manufacture comprising a tangible computer storage readable medium having computer readable program code means embodied therein for causing encryption of a data stream that is transmitted from a sender to a receiver via a channel after at least a part of which is encrypted, the computer readable program code means in said article of manufacture comprising computer readable program code means for causing a computer to effect the steps of:
  adjusting encryption attributes during transmission based upon a complexity consideration of a situation of the sender, the receiver and the channel, wherein said adjusting encryption attributes comprises:
  determining whether there is a need to adjust said encryption attributes based on quality of the channel; if so, adjusting the encryption attributes wherein said step of adjusting encryption attributes comprises:
  determining whether current BER of the channel has increased by a first predetermined amount;
  if said current BER of the channel has increased by the first predetermined amount, adjusting the encryption attributes to reduce an error propagation length of the encryption;
  determining whether the current BER of the channel has decreased by a second predetermined amount; and
  if said current BER of the channel has decreased by the second predetermined amount, adjusting the encryption attributes to increase the error propagation length of the encryption;
  encrypting the data stream according to the adjusted encryption attributes; and
  transmitting the encrypted data stream and information of said encryption attributes to said receiver.

26. An article of manufacture of claim 25, wherein said step of adjusting encryption attributes comprises:
  determining whether it is needed to adjust said encryption attributes based on current resource consumption of the sender, the receiver or both; and
  if so, adjusting the encryption attributes.

27. An article of manufacture comprising a tangible computer storage readable medium having computer readable program code means embodied therein for causing decryption of a data stream that is transmitted from a sender to a receiver via a channel after at least a part of which is encrypted, the computer readable program code means in said article of manufacture comprising computer readable program code means for causing a computer to effect the steps of:
  receiving adjusted encryption attributes during reception of the encrypted data stream based upon a complexity consideration of a situation of the sender, the receiver and the channel, wherein adjusting encryption attributes comprises:

determining whether there is a need to adjust said encryption attributes based on quality of the channel; if so, adjusting the encryption attributes wherein said step of adjusting encryption attributes comprises:

determining whether current BER of the channel has increased by a first predetermined amount;

if said current BER of the channel has increased by the first predetermined amount, adjusting the encryption attributes to reduce an error propagation length of the encryption;

determining whether the current BER of the channel has decreased by a second predetermined amount; and is said current BER of the channel has decreased by the second predetermined amount, adjusting the encryption attributes to increase the error propagation length of the encryption; and decrypting the data stream according to said adjusted encryption attributes.

28. An article of manufacture comprising a tangible computer storage readable usable medium having computer readable program code means embodied therein for causing decryption of a data stream that is transmitted from a sender to a receiver via a channel after at least a part of which is encrypted, the computer readable program code means in said article of manufacture comprising computer readable program code means for causing a computer to effect the steps of:

receiving adjusting encryption attributes during reception of the encrypted data stream based upon a complexity consideration of a situation of the sender, the receiver and the channel, wherein adjusting encryption attributes comprises;

determining whether there is a need to adjust said encryption attributes based on quality of the channel; if so, adjusting the encryption attributes wherein said steps of adjusting encryption attributes comprises:

determining whether current BER of the channel has increased by a first predetermined amount;

if said current BER of the channel has increased by the first predetermined amount, adjusting the encryption attributes to reduce an error propagation length of the encryption;

determining whether the current BER of the channel has decreased by a second predetermined amount; and if said current BER of the channel has decreased by the second predetermined amount, adjusting the encryption atttributes to increase the error propagation length of the encryption; and decrypting the data stream according to said adjusted encryption attributes.

29. A computer program product comprising a tangible computer storage readable medium having computer readable program code means embodied therein for causing encryption of a data stream that is transmitted from a sender to a receiver via a channel after at least a part of which is encrypted, the computer readable program code means in said computer program product comprising computer readable program code means for causing a computer to effect the functions of:

encryption attribute adjusting means for adjusting encryption attributes during transmission of the data stream to generate encryption attribute information based upon a complexity consideration of a current situation of the sender, the receiver and the channel, wherein adjusting encryption attributes comprises:

determining whether there is a need to adjust said encryption attributes based on quality of the channel; if so, adjusting the encryption attributes wherein said step of adjusting encryption attributes comprises:

determining whether current BER of the channel has increased by a first predetermined amount;

if said current BER of the channel has increased by the first predetermined amount, adjusting the encryption attributes to reduce an error propagation length of the encryption;

determining whether the current BER of the channel has decreased by a second predetermined amount; and if said current BER of the channel has decreased by the second predetermined amount, adjusting the encryption attributes to increase the error propagation length of the encryption; and a scrambler for performing encryption of said at least part of the data stream according to the encryption attributes adjusted by said encryption attribute adjusting means.

* * * * *